MEANS FOR MERGING SEQUENCES OF DATA

Filed Aug. 26, 1965 4 Sheets-Sheet 1

INVENTOR
KENNETH E. BATCHER
BY A. H. Oldham
ATTORNEY

Dec. 24, 1968 K. E. BATCHER 3,418,632

MEANS FOR MERGING SEQUENCES OF DATA

Filed Aug. 26, 1965 4 Sheets-Sheet 2

INVENTOR
KENNETH E. BATCHER
BY A.H. Oldham
ATTORNEY

MEANS FOR MERGING SEQUENCES OF DATA

Filed Aug. 26, 1965 4 Sheets-Sheet 3

INVENTOR
KENNETH E. BATCHER
BY H. H. Oldham
ATTORNEY

| | 1 | 2 | 3 | 4 | 5 |
|---|---|---|---|---|---|
| | A WITH B | A WITH B | A WITH B | A WITH 1 | A WITH 1 |
| REQUIRES 60 → | $\frac{A}{2}$ WITH $\frac{B}{2}$ | $\frac{A}{2}$ WITH $\frac{B+1}{2}$ | $\frac{A+1}{2}$ WITH $\frac{B+1}{2}$ | $\frac{A}{2}$ WITH 1 | $\frac{A+1}{2}$ WITH 1 |
| REQUIRES 61 → | $\frac{A}{2}$ WITH $\frac{B}{2}$ | $\frac{A}{2}$ WITH $\frac{B-1}{2}$ | $\frac{A-1}{2}$ WITH $\frac{B-1}{2}$ | NOTHING | NOTHING |
| | WHEN | WHEN | WHEN | WHEN | WHEN |
| | A IS EVEN | A IS EVEN | A IS ODD | A IS EVEN | A IS ODD |
| | B IS EVEN | B IS ODD | B IS ODD | | |

FIG.-9

| | 1 | 2 | 3 |
|---|---|---|---|
| | 14 WITH 8 | 14 WITH 7 | 15 WITH 7 |
| REQUIRES | 7 WITH 4 | 7 WITH 4 | 8 WITH 4 |
| REQUIRES | 7 WITH 4 | 7 WITH 3 | 7 WITH 3 |
| SUB-GROUP | 4+2 (2+1)(2+1)<br>3+2 (2+1)(1+1) | 4+2 (2+1)(2+1)<br>3+2 (2+1)(1+1) | 4+2 (2+1)(2+1)<br>4+2 (2+1)(2+1) |
| SUB GROUP | 4+2 (2+1)(2+1)<br>3+2 (2+1)(1+1) | 4+2 (2+1)(2+1)<br>3+1 (2+1)(1+0) | 4+2 (2+1)(2+1)<br>3+1 (2+1)(1+0) |
| | NOTE: PLUS SIGN INDICATES "WITH" | | |

FIG.-10

INVENTOR
KENNETH E. BATCHER
BY A. H. Oldham
ATTORNEY

United States Patent Office 3,418,632
Patented Dec. 24, 1968

3,418,632
MEANS FOR MERGING SEQUENCES OF DATA

Kenneth E. Batcher, Akron, Ohio, assignor to Goodyear Aerospace Corporation, Akron, Ohio, a corporation of Delaware Filed Aug. 26, 1965, Ser. No. 482,695
3 Claims. (Cl. 340—146.2)

ABSTRACT OF THE DISCLOSURE

The invention provides a merging means which utilizes basic merging components in substantially equally divided subdivisions to effect a merge of two sequences of data each arranged in ascending order phere the number of data in each sequence may vary without limits, but the fundamental combinations of the merging means will be broken down into easily determined basic sub-units dependent upon the number of data to be merged. Several overall total merges into the arranged components will take place dependent upon the number of data to be arranged. Once the elements are properly arranged, it is simply a matter of providing the input information in arranged sequences and the resultant output is automatically integrated into a single arranged sequence. The elements can also receive data inputs of equal magnitude without any change in the operation of the system.

This invention relates to a merging means, and more particularly to a unique arrangement of basic elements each adapted to receive two data, compare their magnitudes, and present the greater of the two at one output, the lesser on another output, whereby two sequences of data, each arranged in ascending order, can be merged into one sequence arranged in ascending order.

Heretofore, it has been well known that there have been many and various types of merging means adapted to merge two groups of sequentially oriented numbers into a single group, but these prior art systems have been unduly cumbersome, extremely expensive, difficult to construct, and requiring many components when the numbers of data to be merged have been very large. Such prior art techniques are shown in an artle entitled "A Sorting Problem," Journal of the Association for Computing Machinery, vol. 9 (1962) at pages 282–296. Similarly, another system is described in an article entitled, "A Simple Sorting Algorithm," Journal of the Association for Computing Machinery, vol. 10 (1963), pages 142–150. These procedures require no storage outside of that needed for the given set of data, and the program is "fixed" in the sense that the outcome of any one comparison does not effect which comparisons are performed afterwards. But these prior art merging techniques require considerable elements, expense and time and thus have proved essentially inapplicable to the the rapidly growing field of development of digital computers.

The historical development of digital computers shows that initially higher processing speeds were obtained mostly by using faster components and more recently higher speeds have been obtained by doing operations simultaneously that previously were done one at a time. In the future, therefore, we should expect computers with a large number of simultaneous operating arithmetic units and in-out channels. The major problem in such a computer is the need of giving all units fast access to the data that they need.

This problem exists in present day computers where memories are divided into several banks so that while one channel is accessing one memory bank, other channels can be accessing other banks. However, when two or more channels need acces to the same memory bank, only one of the channels is permitted access, while the others must wait. It can be expected that the frequency of these conflicts will be very high if there are hundreds of channels, so this method doesn't look very promising. Ideally, no conflict should arise in a memory capable of performing hundreds of accesses simultaneously, even when several channels want the same word.

One way to build a memory with $m$ words and $n$ access lines is to use the matrix or cross bar switch with $m$ rows and $n$ columns. The amount of equipment in such an arrangement is proportional to $mn$, a prohibitive number for reasonable size memories. Another disadvantage of the matrix is the fan-out and fan-in required for some of its elements since there must be a gate for each word in memory loading each access line. The fan-out and fan-in required can be reduced by well known "treeing" techniques, but this increases the amount of elements even more. It thus becomes apparent, that other networks of elements which perform thes ame function as the $mn$ cross-bar, which uses lesser elements, and in which the fan-in and fan-out required of each element is constant regardless of $m$ and $n$ is needed by the art. It is this need which may be met by a suitable sorting and merging technique.

Therefore, it is the general object of the invention to meet the needs and requirements of the art for a sorting and merging apparatus which is simple, highly efficient, inexpensive, and which requires a very minimum of sorting elements to perform the desired merging function.

A further object of the invention is to provide a merging apparatus to merge two sequences of data, each arranged in ascending order, into one sequence arranged in ascending order with a minimum of equipment and in a minimum of time.

A further object of the invention is to provide a means for merging two sequences of data, each arranged in ascending order, into one sequence arranged in ascending order to construct a multiple access memory, a parallel associative memory, or to be combined with multiple processing elements to construct a parallel processor.

A further object of the invention is to provide a merging means which uses significantly less equipment and time than previously known to effects a merge of two sequences of datum, each arranged in ascending order into one sequence arranged in ascending order.

A further object of the invention is to provide a merging means which utilizes basic merging components in substantially equaly divided subdivisions to effect a merge of two sequences of data each arranged in ascending order, where the number of data in each sequence may vary without limits, but the fundamental combinations of the merging means will be broken down into easily determined basic sub-units dependent upon the number of data to be merged.

The aforesaid objects of the invention and other objects which will become apparent as the description proceeds are achieved by providing in combination a group of $s$ numerical data arranged in ascending order, a group of $t$ numerical data arranged in ascending order, means to compare correspondingly odd data of the $s$ and $t$ data in a first merge to arrange such data as outputs in ascending order, means to compare corresponding even data of the $s$ and $t$ data in a second merge to arrange such data as outputs in ascending order, and means to compare in a third merge the second output of the first merge to the first output of the second merge and each corresponding data of both the first and second merges in the same manner to produce data outputs whereby the outputs of the third merge represent the total data of the $s$ and $t$ data arranged in ascending order.

For a better understanding of the invention, reference should be had to the accompanying drawings wherein:

FIGURE 9 is a table illustrating the various mathematical relationships of the basic elements necessary to merge two sequences of data for the total various possibilities that do exist; and FIGURE 10 is a table illustrating actual numbers inserted into the formulas of the table of FIGURE 9 showing exactly how the basic modules are determined.

Figure 1:
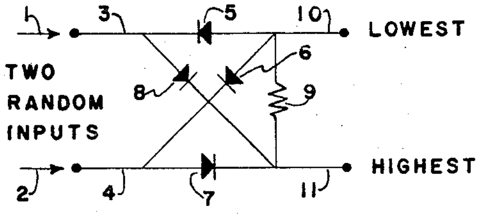
FIGURE 1 is a schematic illustration of a basic comparison element to arrange two random inputs into known ascending order.

There are many basic elements which will compare two data and present the highest of the two on one output, the lowest on another output. For example, if the data are represented by analogue voltages then the diode circuit bridge illustrated in FIGURE 1 takes two random inputs 1 and 2 introduced on input lines 3 and 4 to the diode bridge consisting of four interrelated diodes 5 through 8 and a cross connecting resistor 9 to represent the lowest of the two voltages on an output 10 and the highest of the two voltages on an output 11. If the data are represented by digital numbers in series or parallel form, there are other well known logic circuits existing for comparing such number representations and presenting the higher on one output, the lower on the other. Normally, if the data have equal magnitudes, their common value is presented on both outputs. These basic elements can conveniently be called electrical comparators, and while the construction thereof can differ widely, such techniques are well within the skill of anyone in the art.

For the purposes of this invention, it will be assumed that conventional sorting by merging techniques will be used to arrange a sequence of data into ascending order, as the purpose of this invention is to merge two sequences, both already arranged in ascending order, into a single merged sequence in ascending order. In other words the invention contemplates that a sorting means can be built by a specific combination of merging means.

Figure 2:
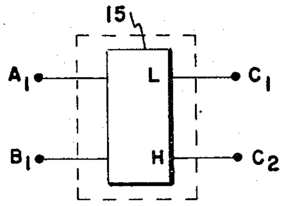
FIGURE 2 is a schematic block diagram of the element of FIGURE 1.

FIGURE 2 illustrates in block diagram form a single element 15 which receives input data $A_1$ and $B_1$ and arranges them in ascending sequence $C_1$ and $C_2$, all in the same manner as set forth with reference to FIGURE 1 above.

In order to merge two data $A_1$ and $A_2$, arranged in sequenec, two elements 16 and 17, are provided which illustrates the basic rule which will be continuously followed hereinafter. Essentially, the first merge will be indicated by the dotted block 16A while the second merge will be considered by the dotted block 17A. The rule to be followed is that the second output of the first merge, namely output 18 is combined with the first output of the second merge, namely output 19 of the second merge, in an element 20. These outputs, in combination with the first output 21 of the first merge and the second output 22 of the second merge arrange the data $A_1$, $A_2$, $B_1$ and $B_2$ in ascending order $C_1$ through $C_4$.

Figure 3:
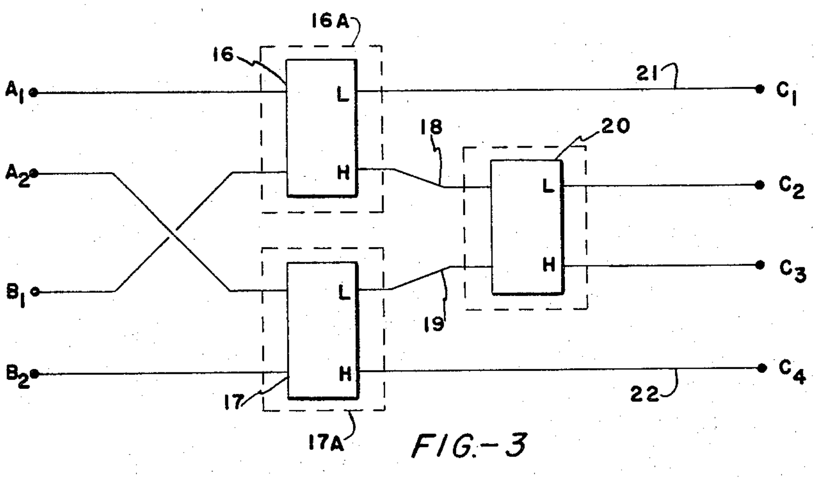
FIGURE 3 is a schematic block diagram of three of the elements of FIGURE 2 arranged to merge two groups of two data into one group of four data in ascending order.
Figure 4:
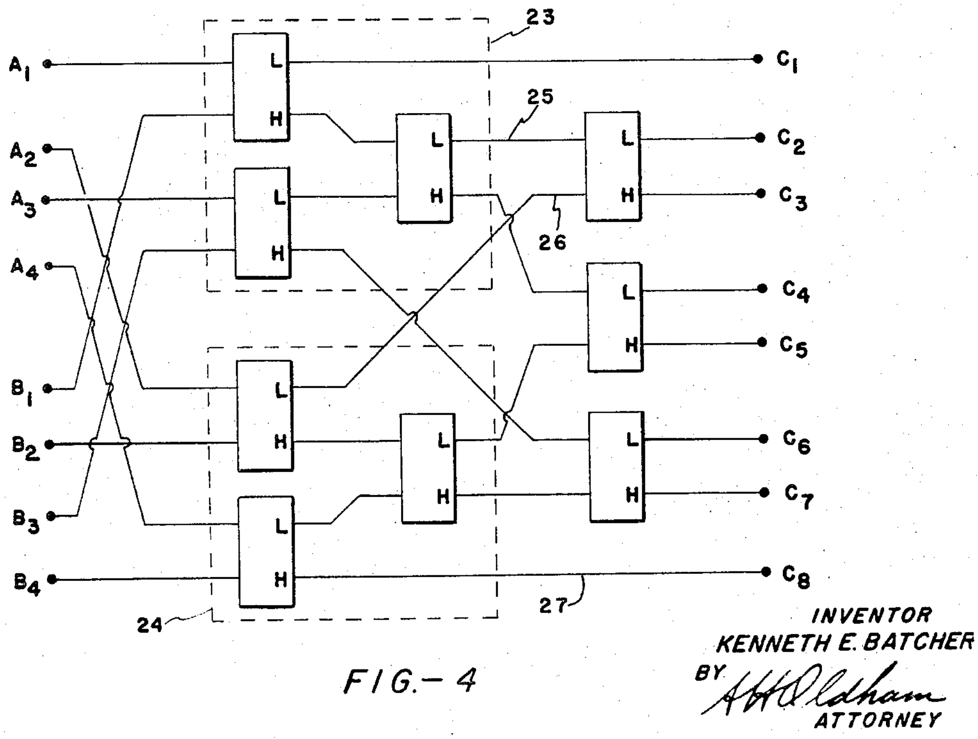
FIGURE 4 is a schematic block diagram utilizing the basic component taught by FIGURE 3 to arrange two groups of four data into one group of eight data in ascending order.

In order to arrange together two ascending groups of four data, namely $A_1$ through $A_4$ and $B_1$ through $B_4$, as seen in FIGURE 4, the basic group of FIGURE 2 is utilized, only twice, as indicated by the dotted subcombination groupings 23 and 24. Again, the first data of the first group, namely $A_1$ is merged or compared with the first data of the second group, namely $B_1$. Similarly, $A_3$ is merged with $B_3$, in the first grouping 23, while the even numbers are merged in a second grouping. Thus, $A_2$ as merged with $B_2$, and $A_4$ with $B_4$ in the second grouping 24. The same rule on comparing the outputs of each merge holds true as the second output 25 of the first merge is compared or further merged with the first output 26 of the second merge. Similar comparisons are made to determine the final sequential ascending grouping $C_1$ through $C_8$. Where the fourth output 27 of the second merge has nothing with which to compare, it comes straight out, similar to the second output 22 of the first merge, as seen in FIGURE 3.

Figure 5:
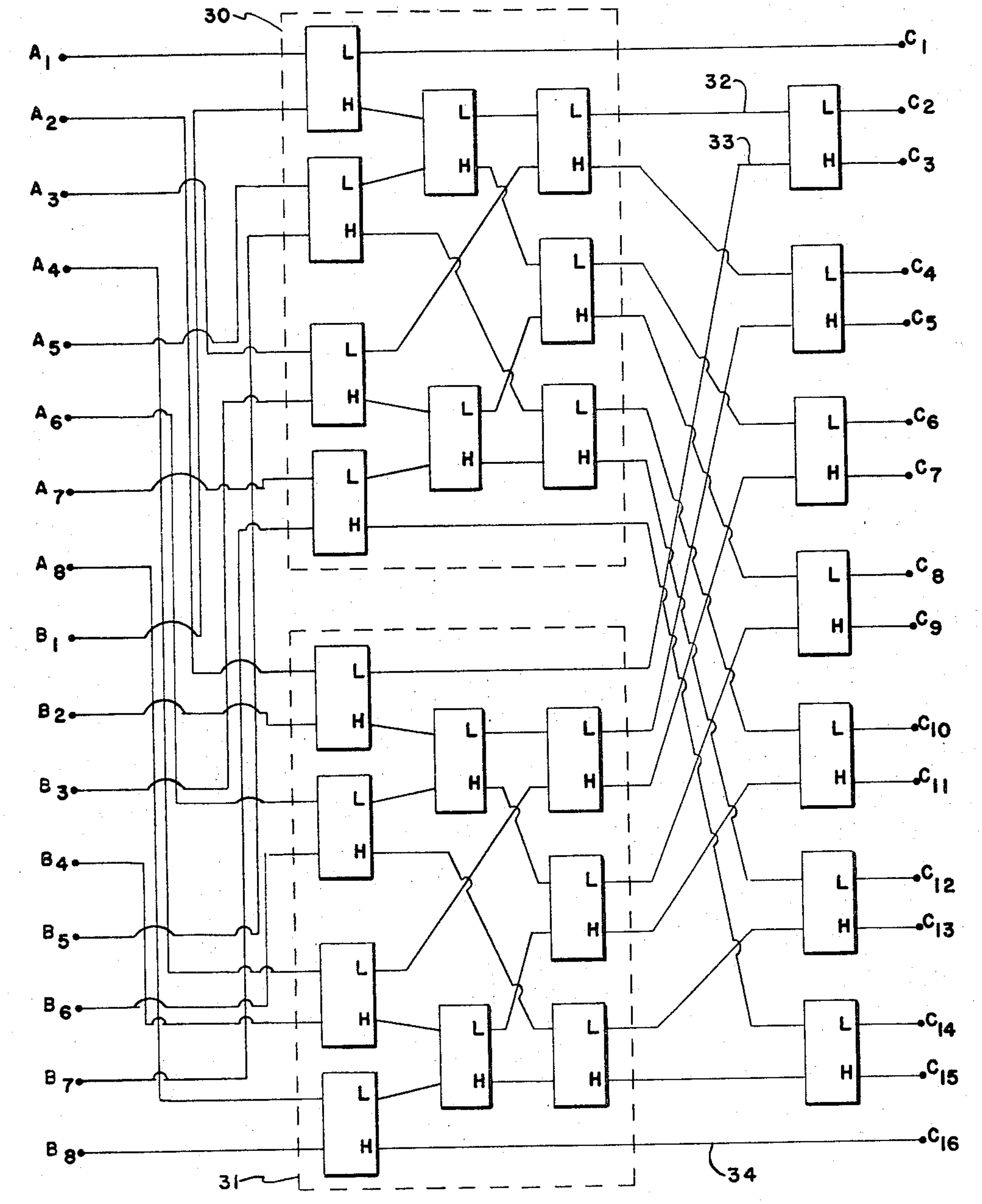
FIGURE 5 is a schematic block diagram illustrating how the basic group of FIGURE 4 can be used in pairs to arrange two sequences of eight data into one sequence of sixteen data in ascending order.

FIGURE 5 illustrates the merging of two groups of eight numbers arranged in ascending order. In this instance, $A_1$ through $A_8$ and $B_1$ through $B_8$ are merged. To this end, two basic merging groups are provided, namely a group indicated by dotted block 30 and a second group indicated by dotted block 31. It should be noted that dotted blocks 30 and 31 conform to the exact arrangement for the merger of four with four shown in FIGURE 4. Again, the same procedure for merging is utilized with $A_{1,3,5}$, and $A_7$ merged with $B_{1,3,5}$ and $B_7$ in the first merging group 30 and the even numbers merged with their corresponding even number in the second group 31. Similarly, the second output 32 of the first merge is compared with the first output 33 of the second merge, with the similar sequence being applied until all outputs have been compared in the same manner, leaving only the eighth output 34 of the second merge to be the last sequential number. The outputs then represent sixteen numbers $C_1$ through $C_{16}$ arranged in ascending order.

Figure 6:
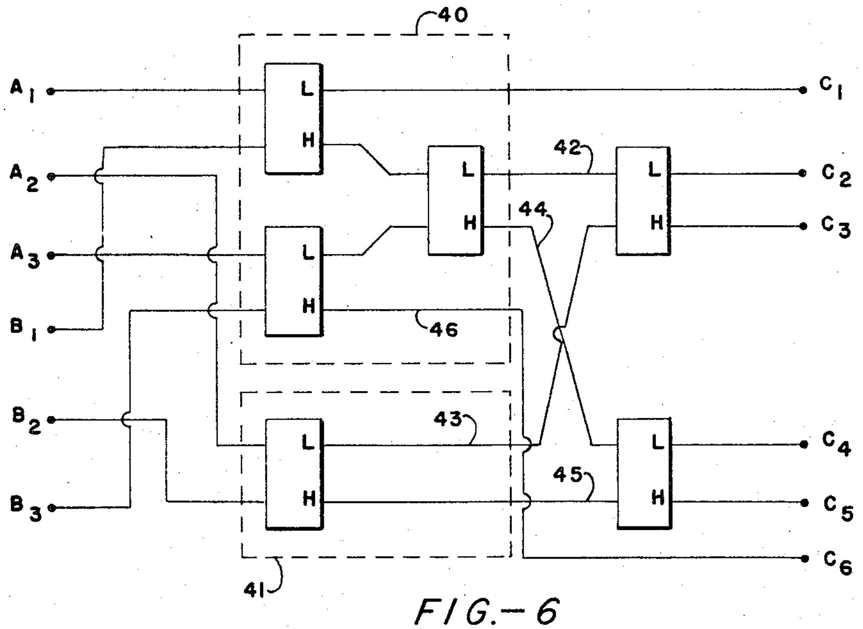
FIGURE 6 is a schematic block diagram illustrating how the basic units of FIGURES 2 and 3 are combined to make one unit for arranging two sequences of three data into one sequence of six data in ascending order.

FIGURE 6 illustrates a merging means for three numbers with three numbers which comprises a first merging group, illustrated by dotted block 40, which is a basic two by two merging group of FIGURE 3, and as the second merging group, a one by one merging group, illustrated by dotted block 41. Thus, numbers $A_1$ through $A_3$ and $B_1$ through $B_3$ are merged in the same manner as defined above. Namely, $A_1$ and $A_3$ are merged with $B_1$ and $B_3$, respectively, in the first merging group 40 while $A_2$ and $B_2$ are merged in the second merging group 41. Again, the second output 42 of the first group is merged with the first output 43 of the second group and in the same manner the third output 44 of the first group is merged with the second output 45 of the second group. The fourth output 46 of the first group having nowhere to go comes to the bottom to become the last output in the sequentially arranged data $C_1$ through $C_6$.

When the two sequences to be merged have unequal numbers of data the construction of the merging means is still the same, i.e., the odd-indexed data of one sequence, $A_{1,3,5}$, etc. are merged with the odd-indexed data of the other sequence, $B_{1,3,5}$, etc. in a first merge while the even-indexed data of one sequence, $A_{2,4,6}$, etc. are merged with the even-indexed data of the other sequence, $B_{2,4,6}$, etc. in a second merge. The outputs of the first and second merge are merged the same way, i.e., the second output of the first merge is merged with the first output of the second merge, the third output of the first merge is merged with the second output of the second merge, etc.

Figure 7:
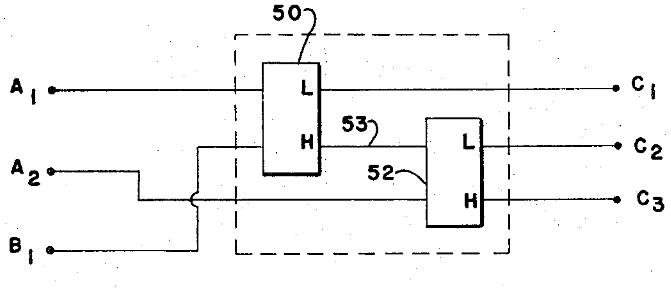
FIGURE 7 illustrates a block diagram of basic elements necessary for merging two data with one data to provide a single sequence of three data in ascending order.

If one of the sequences has only one datum while the other has more than one datum, then there are no even-indexed data in the one sequence. In this case the aforementioned second merge has no elements. It receives the even-indexed data of the sequence with more than one data and presents these data on its outputs with no rearrangement. The rule for merging these outputs with the outputs of the first merge is still the same. For example, FIGURE 7 illustrates a merging means for two data with one data which utilize a one by one element 50 in the first merge to merge $A_1$ with $B_1$. Element 52 merges the second output 53 of the first merge with the only even-indexed term $A_2$ to determine the outputs $C_2$ and $C_3$.

Figure 8:
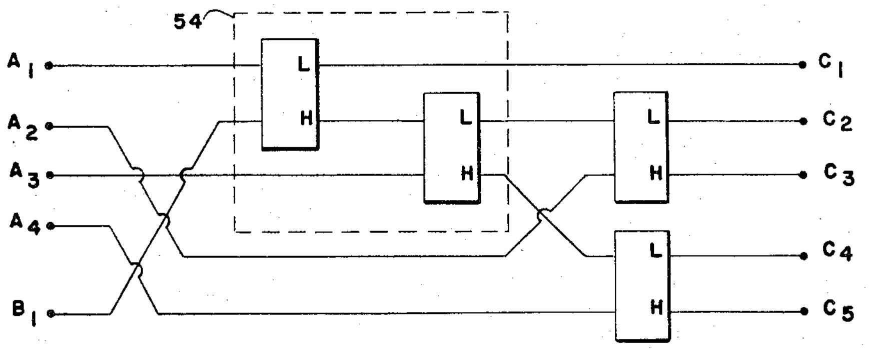
FIGURE 8 illustrates a block diagram for arranging a sequence of four data with a sequence of one datum to produce a single sequence of five data in ascending order.

A similar example is illustrated in FIGURE 8 where a merging means for four data with one data is illustrated as comprising a two by one merging roup indicated by dotted block 54. In this instance $A_1$ and $B_1$, are merged in the usual manner which each remaining A data following the usual directive pattern.

All possible merging sequences will be solved by the five examples shown in FIGURE 9. Column 1 illustrates element requirement for a grouping necessary for comparing A and B where A is even and B is even. Column 2 represents the element for combining A and B where A is even and B is odd. Column 3 represents combining A and B where A is odd and B is odd. Column 4 represents combining A with 1 where A is even, and column 5 represents combining A with 1 where A is odd. The element requirement set forth in lines 1 and 2 indicated by numerals 60 and 61 represent the element groupings necessary to form the first and second merge groupings. Note in columns 4 and 5 that there does not need to be a second merge grouping since only one data is merged with the A number of data.

FIGURE 10 illustrates representative numbers which might fit the element definitions of columns 1 through 3, as shown in FIGURE 9. This table indicates that the first sub-totals are broken to further sub-combinations in the same manner. Thus, the eleven total of seven and four in column 1 breaks into the subcombinations of four and two, and three and two. These in turn break into their own sub-combinations of two, two and one groups and a two and one plus a one and one. The larger number of the most equal division of each group is combined with the larger number of the group to which the merger will take place. Therefore, it should readily be seen that the basic merging elements shown by the dotted blocks in FIGURES 2 through 8 can be readily combined to build up much larger basic merging groupings to apply this specific technique for merging groupings of unlimited numbers.

Thus, it is seen that the objects of the invention have been achieved by providing a means for merging two sequences of data, each arranged in ascending order, into one sequence arranged in ascending order realized by merging the odd-numbered terms of each sequence in a first merging grouping, merging the even numbered terms of each sequence in a second merger grouping, then comparing the resultant outputs in a third merge in a manner consisting of merging the second output of the first merge with the first output of the second merge, the third output of the first merge with the second output of the second merge, etc. to complete the third merge. Thus, rules apply to achieve the merge of two sequences of any number and/or length into a single sequence.

Multiple access memories can be constructed using these networks. For example, let a memory have *t* words, each addressed by a number, and *s* data request lines which request *s* words by their addresses. A sorting network is used to arrange the *s* request in order by the addresses. A merging network follows this to merge the *s* request with the *t* word address of the memory. Then circuits at the output of the merging network compare successive lines and when they detect a request next to the word it is requesting, they may "jumper" the two.

Also, these circuits have use in parallel processors, since they permit several "requests" to be associated with their respective data. Parallel associative memories can be built, using these networks, which are capable of executing many associative operations, or "exact matches" at the same time.

It has been shown above that the merging network for merging S elements with T elements, or A elements with B elements is built up from merging networks of smaller degree. FIGURE 9 indicates how to construct a merging network from smaller networks and basic elements. The utilization of specific numbers, as shown in FIGURE 10, indicates how the smaller networks in turn are constructed from still smaller networks in the same fashion. The merging then always follows the basic feature of merging the odd numbered data of each sequence in one merging operation and the even numbered data of each sequence in a second merging operation with the outputs of each comparison then compared substantially alternatively in a third merge to achieve the final sequence. In other words, an iterative rule is always followed concerning subdivision of groupings as well as the basic three merge procedure.

It would be possible to use well known time-sharing techniques to thereby share the use of the basic elements so that less elements might be required to effect the merge, but this technique would require more time to operate. Such procedure would depend upon the specific operation to be utilized. However, even using time sharing techniques, the same pattern as defined by the formula and the basic pattern procedure must be followed to effect a merge.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In an apparatus for merging two ascending sequences of digital numerical data each sequence of a number greater than two into one sequence arranged in ascending order the combination of:

a first plurality of electrical comparator means each of which accept two input signal data of different unknown magnitude or equal magnitude and provide two outputs of a known ascending order or equal order of voltage signals, said means arranged into two groupings, some of said means merging the lowest alternating odd data of one sequence in one grouping with the corresponding alternating odd data of the other sequence, the remainder of said means merging alternating even data of said one sequence in sequential order with the corresponding alternating even data of the other sequence in the other group, and a second plurality of electrical comparator means receiving all but two of said voltage signals as inputs from the two groupings of the first plurality of comparator means, some of said second comparator means merging the second lowest output of first grouping with the first lowest output of the second grouping and the remainder of said second comparator means effecting merges simultaneously as last said merge with the third lowest output of the first grouping to the second lowest output of the second grouping, and so on in sequential order including all but two of the outputs of the two groupings in such simultaneous merge, whereby the resultant outputs of the first and second merge equal the total number of input data and represent the two sequences of digital data in one sequence arranged in ascending order.

2. An apparatus to arrange a group of A numerical data equal to an even number greater than two arranged in ascending order, and a group of B numerical data equal to an even number greater than two arranged in ascending numerical order, into a combined sequence in ascending numerical order which comprises:

a first group of electrical comparator means to merge odd A data to their correspondingly ordered odd B data in sequential order to provide electrical outputs of each merge representing an arranged order of numerical value, a second group of electrical comparator means to merge even A data to their correspondingly ordered even B data in sequential order to provide electrical outputs of each merge representing an arranged order of numerical value, a third group of electrical comparator means to merge the first numerical electrical output of the second merge to the second numerical electrical output of the first merge and simultaneously merge the other outputs in the same sequence to provide final electrical outputs equal in number to and representing the A and B data merged into one group of data arranged in ascending numerical order.

3. An apparatus to arrange a group of A numerical data of a number greater than two arranged in ascending order, and a group of B numerical data of a number greater than two arranged in ascending order into one group of numerical data in ascending order comprising:

electrical comparator means to effect two data merges of corresponding odd data of the A and B data in a first merge and produce two outputs of each merge representing the data arranged in numerical order, electrical comparator means to effect two data merges of corresponding even data of the A and B data in a first merge and produce two outputs of each merge representing the data arranged in numerical order, electrical comparator means to effect two data merges to compare the second output of the first merge to the first output of the second merge and each corresponding data of both the first and second merges in the same manner simultaneously in such sequence to produce a number of data outputs equal to the total data of the A and B data arranged in ascending numerical order.

References Cited

UNITED STATES PATENTS

| | | | |
|---|---|---|---|
| 3,015,089 | 12/1961 | Armstrong | 340—172.5 |
| 3,178,690 | 4/1965 | Masters et al. | 340—172.5 |

MALCOLM A. MORRISON, *Primary Examiner.*

D. H. MALZAHN, *Assistant Examiner.*

U.S. Cl. X.R.

235—177